United States Patent
Brown et al.

(10) Patent No.: US 10,572,488 B2
(45) Date of Patent: Feb. 25, 2020

(54) SYSTEM AND METHOD FOR DATA ORGANIZATION, OPTIMIZATION AND ANALYTICS

(71) Applicant: Koverse, Inc., Fairfax, VA (US)

(72) Inventors: Paul Brown, North Bend, WA (US); Travis Collins, Fairfax, VA (US); Aaron Cordova, Laurel, MD (US); Jared Winick, Denver, CO (US); Chad Hardin, Kent, WA (US); Matthew Meadows, Kenmore, WA (US); Stanley C Sorensen, Seattle, WA (US); Ian Corey Barker, Puyallup, WA (US); David Lee Barker, Camas, WA (US)

(73) Assignee: Koverse, Inc., Seattle, WA (US)

( * ) Notice: Subject to any disclaimer, the term of this patent is extended or adjusted under 35 U.S.C. 154(b) by 303 days.

(21) Appl. No.: 14/738,649

(22) Filed: Jun. 12, 2015

(65) Prior Publication Data

US 2015/0363498 A1 Dec. 17, 2015

Related U.S. Application Data

(60) Provisional application No. 62/012,201, filed on Jun. 13, 2014.

(51) Int. Cl.
*G06F 17/30* (2006.01)
*G06F 16/2457* (2019.01)
(Continued)

(52) U.S. Cl.
CPC ........ *G06F 16/2457* (2019.01); *G06F 16/134* (2019.01); *G06F 16/283* (2019.01); *G06F 16/284* (2019.01); *G06F 16/9574* (2019.01)

(58) Field of Classification Search
CPC ......... G06F 17/30867; G06F 17/30595; G06F 17/30522; G06F 17/30864; G06F 16/9574;
(Continued)

(56) References Cited

U.S. PATENT DOCUMENTS 8,996,456 B2 * 3/2015 Naidu ............... G06F 8/453
707/610
9,201,558 B1 * 12/2015 Dingman ............ G06F 3/048
(Continued)

OTHER PUBLICATIONS

Jayaram., Towards Explicitly Elastic Programming Frameworks, 2015, IEEE, 619-622.*
(Continued)

*Primary Examiner* — Jean M Corrielus
(74) *Attorney, Agent, or Firm* — Foster Garvey PC; P. G. Scott Born (57) ABSTRACT

A system and method for data organization, optimization and analytics includes a web server, thrift server, distributed processing framework, key value store, distributed file system, and relational database. The web server provides a method whereby users issue control actions and query for records via interaction with the thrift server. The thrift server is the center of coordination and communication for the system and interacts with other system elements. The key value store organizes all of the operational data for the system. The key value store runs on a highly scalable distributed system, including a distributed file system for storage of data on disk. The distributed processing framework enables data to be processed in bulk and is used to execute analytical processing on the data. The relational database hold all of the administrative data in the system. Search queries are submitted by end user and results of the search query are sent from the web server to the end user. The web server sends control actions to queue background
(Continued)

map reduce jobs. These jobs run in the distributed processing framework and are used to write data and indexes and execute bulk analytics against the key value store.

6 Claims, 9 Drawing Sheets

(51) Int. Cl.
  *G06F 16/28* (2019.01)
  *G06F 16/957* (2019.01)
  *G06F 16/13* (2019.01)
(58) Field of Classification Search
  CPC ... G06F 16/2457; G06F 16/284; G06F 16/134
  USPC .......................................................... 707/722
  See application file for complete search history.

(56) References Cited

U.S. PATENT DOCUMENTS

| 9,734,221 | B2* | 8/2017 | Sarferaz | G06F 16/22 |
| 9,734,230 | B2* | 8/2017 | Sarferaz | G06F 16/283 |
| 9,773,048 | B2* | 9/2017 | Sarferaz | G06F 16/254 |
| 10,025,834 | B2* | 7/2018 | Kara | G06F 17/30554 |
| 2012/0182882 | A1 | 7/2012 | Chrapko et al. | |
| 2012/0317200 | A1 | 12/2012 | Chan | |
| 2013/0124466 | A1* | 5/2013 | Naidu | G06F 8/453 707/610 |
| 2014/0114994 | A1* | 4/2014 | Lindblad | G06F 17/30545 707/756 |
| 2014/0129530 | A1* | 5/2014 | Raufman | G06F 7/78 707/693 |
| 2014/0278755 | A1* | 9/2014 | Eberl | G06F 16/24578 707/609 |
| 2015/0032725 | A1* | 1/2015 | Barykin et al. | 707/722 |
| 2015/0074037 | A1* | 3/2015 | Sarferaz | G06F 16/22 707/602 |
| 2015/0074038 | A1* | 3/2015 | Sarferaz | G06F 16/254 707/602 |
| 2015/0074053 | A1* | 3/2015 | Sarferaz | G06F 16/283 707/634 |
| 2015/0169709 | A1* | 6/2015 | Kara | G06F 17/30554 707/736 |

OTHER PUBLICATIONS

International Search Report and Written Opinion for PCT Application No. PCT/US2015/035679, dated Sep. 30, 2015, 6 pages

* cited by examiner

SYSTEM AND METHOD FOR DATA ORGANIZATION, OPTIMIZATION AND ANALYTICS

COPYRIGHT NOTICE

This disclosure is protected under United States and/or International Copyright Laws. © 2015 Koverse, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyright rights whatsoever.

PRIORITY CLAIM

The present application claims priority from U.S. Provisional Patent Application Ser. No. 62/012,201 filed Jun. 13, 2014, which is incorporated by reference as if fully set forth herein.

FIELD OF INVENTION

This invention is in the field of data storage and processing for the purposes of deriving insights and intelligence from that data.

BACKGROUND OF THE INVENTION

In data management, a topic of keen interest to many organizations is how to effectively develop and utilize analytics to impact any and all aspects of business. The most important factor in the value provided by an analytic is not the sophistication, scale or accuracy of the insights provided, but how successfully analytics are integrated into the mission of the organization.

If an organization is going to constantly advance the way that it uses data and analytics, all parties involved in the creation and usage of analytics; Data Engineers, Data Scientists, Business Analysts and Business Consumers may work as an integrated team, constantly evolving techniques and procedures to better leverage their data for their business.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

This patent application describes one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc, that perform particular tasks or implement particular abstract data types. The invention may also be practiced in distributed computing environments where tasks are performed by remote processing devices that are linked through a communications network, in a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RE, infrared and other wireless media. Combinations of the any of the above should also be included within the scope of computer readable media.

According to one or more embodiments, the combination of software or computer-executable instructions with a computer-readable medium its in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Key to an effective data team is their ability to lower their time to market for new analytics and enhancements. The primary advantage of this invention is that through all of its integrated features it dramatically lowers the time to market for new analytics. Those key features are.

Modular and Reusable: data sources, data sets, data flows, analytics and applications are modular such that they can easily be repurposed or modified to solve new use cases.

Adaptive Schemas: ingesting new datasets into a data warehouse or similar analytic platform requires specification of the data schema up front. This invention is an adaptive schema architecture and hence able to efficiently ingest new data and adapt to its schema, resulting in little or no up-front work.

Data Discovery: knowing what data is relevant to a given analytic need can sometimes be a challenge. Frequently data is locked away in siloed databases making it impossible determine which datasets contain information relevant to a given problem. Within a this system, all data is indexed by default; and as a result; the data discovery process only takes a few minutes via simple interactive queries to identify the specific data records, documents or datasets most relevant to the problem at hand. This combined with the adaptive schema architecture results in a very powerful capability.

Prototype to Product: Once an operationally useful analytic is developed, frequently the case that the analytic needs to be productized. Workflows need to be formalized, access controls and auditing functionality needs to be added, the analytic needs to be scaled to support the end users daily needs. This invention provides all of these functions to all data and analytics implemented within it automatically, as such operationalizing an experimental analytic is a trivial matter.

To appreciate the impact of invention, one must consider the roles involved in integrating data into business:

Data Engineers: know and are able to access and retrieve data from systems and data sources throughout the organization.

Data Scientists: have deep knowledge of data, algorithms, statistics and computational methods. They develop and apply statistical models and algorithms on the data. They work with data engineers to clean and unify data and produce summary datasets and statistical models for use by the Business Analysts and Consumers.

Business Analysts: know the data in detail and the business needs of the organization. They leverage a range of visualization and business intelligence tools to develop business intelligence reporting. This invention provides them quick access to a range of datasets, integrated into their existing tools. They produce analytic reports for use throughout the organization.

Business Consumers: are drawn from all parts and levels of the businesses. They benefit from quick easy query on raw data in the lake and also from pre-computed insights embedded into existing and new applications. Business Consumers provide feedback to the rest of the data team on the usefulness and suggested improvements of analytics.

Working as a team, via constant interaction, these four roles can address a myriad of business needs, leveraging any and all data and integrating it into business processes, and by using this invention they can do it with a development cycle of days instead of months. How the data is organized in the key-value system for efficient batch updates of derivative data sets.

A preferred embodiment of the present invention is directed to data storage, processing and hosting system for the rapid prototyping and operationalization of analytics to support multiple use cases across multiple datasets within a single system.

Figure 1:
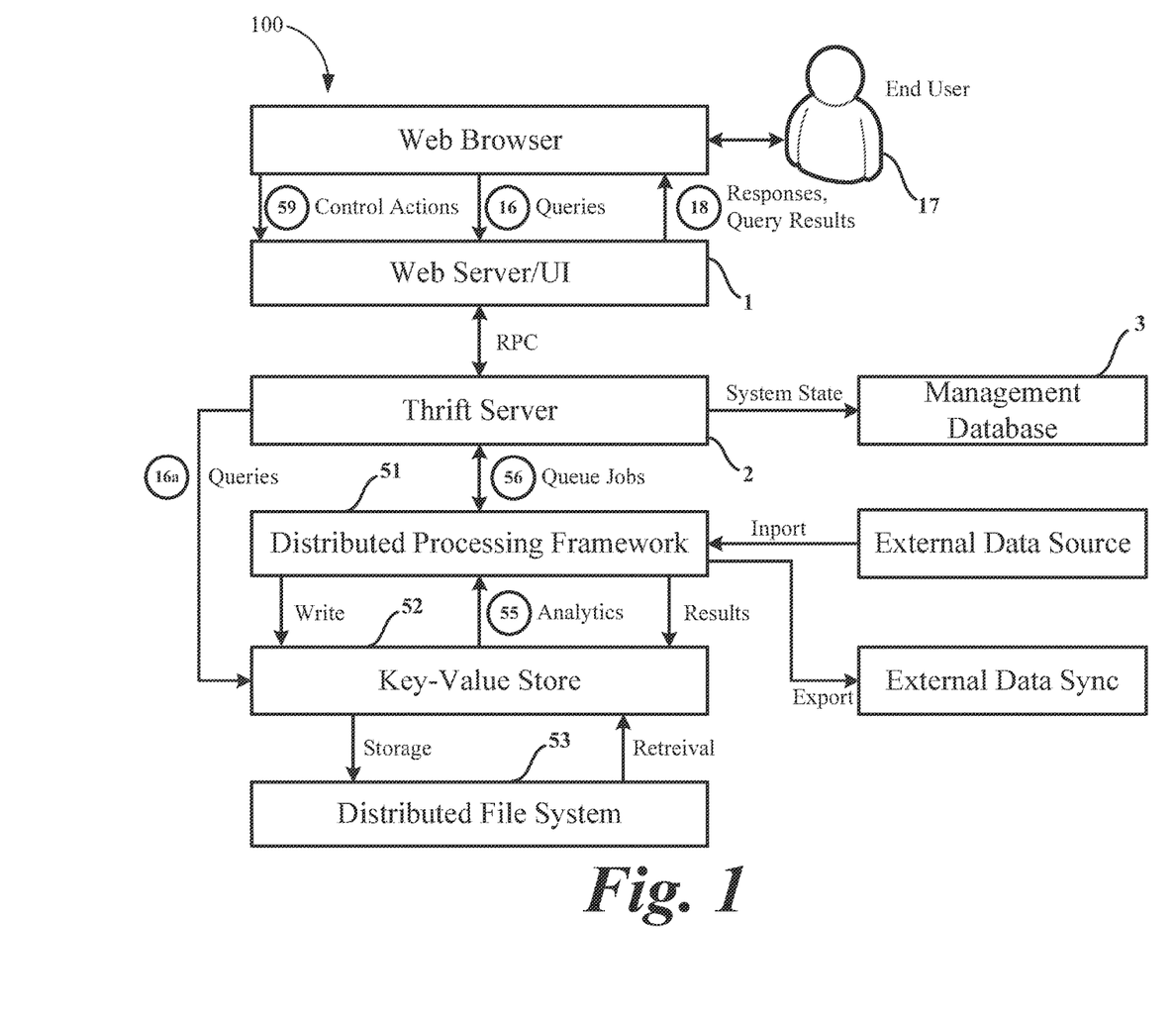
FIG. 1 is an architecture diagram showing the relationship between various components of the system, including key value store, web server and relational database.

Turning now to FIG. 1, an architecture diagram illustrates the relationship between components of a system 100 and method according to preferred embodiment of the present invention: namely, a web server 1, thrift server 2, distributed processing framework 51, key value store 52, distributed file system 53, web server 1 and relational database 3 (also referred to herein as management database). Web server 1 provides a method whereby users issue control actions 54 and query for records via interaction with the thrift server 2. The thrift server 2 is the center of coordination and communication for the system 100 and interacts with other system elements. The key value store 52 organizes all of the operational data tier the system 100. The key value store 2 is intended to be running on a highly scalable distributed system, including a distributed file system 53 for storage of data on disk, and large scale data to be stored, managed and hosted in the file system. The distributed processing framework 51 enables data to be processed in bulk and is used to execute analytical processing 55 on the data. The relational database 3 hold all of the administrative data in the system 100, including logins, audit information, and job scheduling data. Search query(ies) 16 are submitted by end user 17 and are expected to be returned by the web server 1, preferably in a few seconds. Results 18 of the search query (16) are sent from the web server 1 to the end user 17 and are originally drawn from the key value store 52 by the web server 1 via the thrift server 2. The web server 1 sends control actions 54 to queue 56 via RPC calls to the thrift server 2 background map reduce jobs 55. These jobs run in the distributed processing framework 51 and are used to write data and indexes, and execute transforms against the key value store 2.

Figure 2:
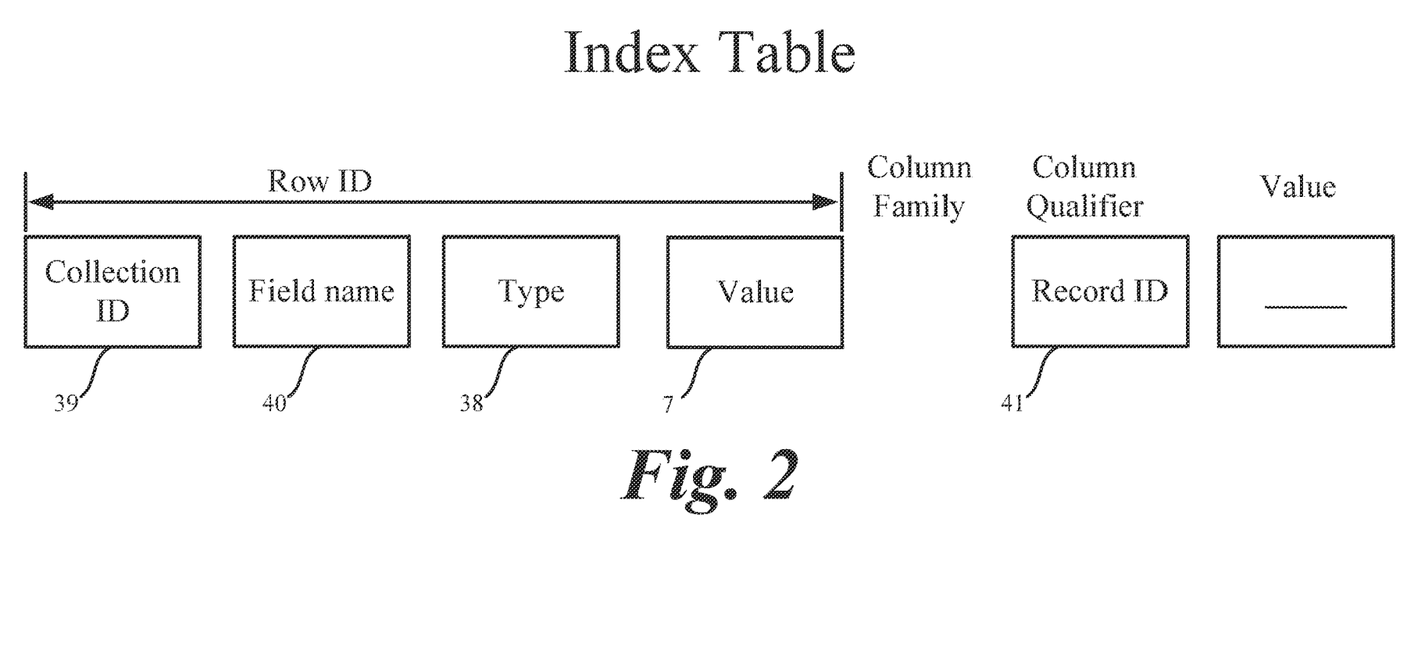
FIG. 2 is a schematic diagram of an index table.
Figure 3:
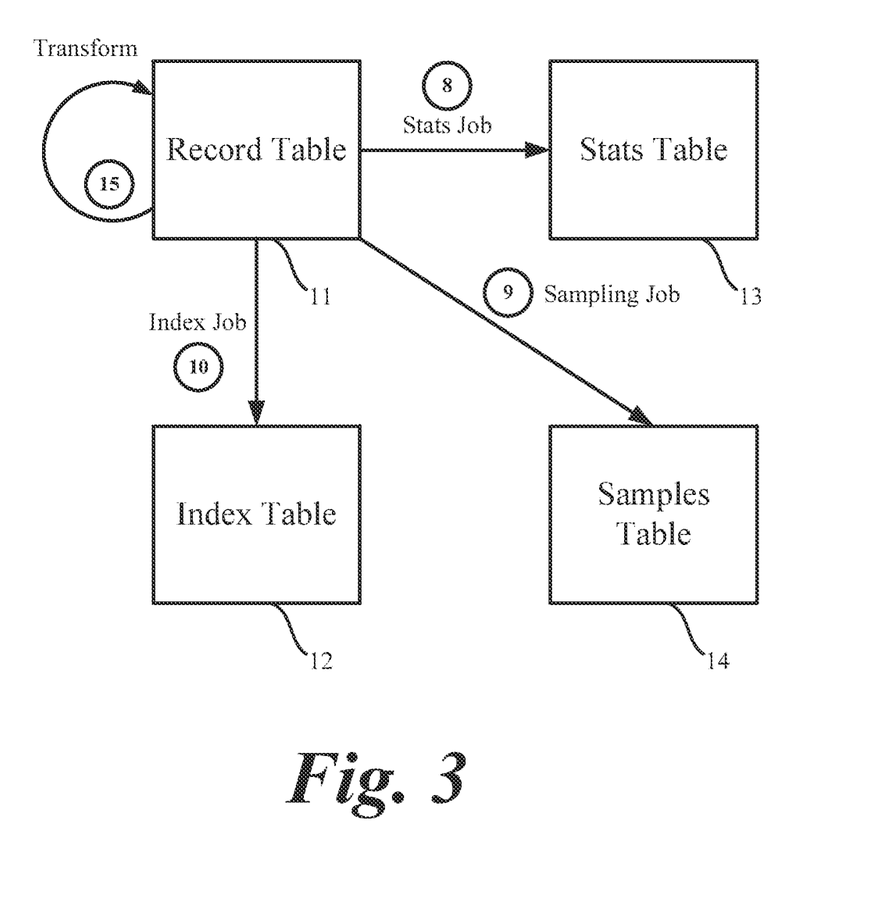
FIG. 3 is a schematic diagram showing the relationship between four tables in the key value store and the processes that maintain them.

FIG. 2 illustrates index table 12, one of the four tables in the key value store 52. These tables store pre-computed information about original records and are used to retrieve records according to specific search criteria quickly, for presenting users with a luminary of the data in a collection, and for allowing users to retrieve a sample of the data in a collection, index table 12 stores all of the indexes both composite and regular. FIG. 3 shows the relationship between the four tables in the key value store and the processes that maintain them. The primary table is the record table 11, which contains a serialized raw record of data in the system. A map reduce stats job 8 processes data within the record table 11 and populates stats table 13 with the result. A map reduce indexing job 10 processes data in the record table 11 and populates the index table 12. A composite index snap reduce job 9 processes data in the record 11 table and populates composite index 14. Finally, transforms 15 process data in the record table 11 and writes the results back to the event table 11.

As illustrated in FIGS. 2 and 3, the record table 11 is the table that enables all processing of operational data. By comparison, the other tables 12, 13, 14 enable search and data assessment. In looking at how data is stored in the event table 11, storing records on disk in time order is desirable so that a new set of records can be processed by processes interested in updating derivative data structures such as indexes and analytical result sets. However, in a distributed key-value system with sorted keys, time-ordered data forces new records to go to one machine, eliminating parallelism in the system. Using appropriate key structure consisting of bucket IDs added to the beginning and batch IDs the system can store new records in multiple machines in parallel, and read a new set of records in parallel for the purposes of updating downstream data structures. This results in very high performance for both query and bulk analytics.

Figure 4:
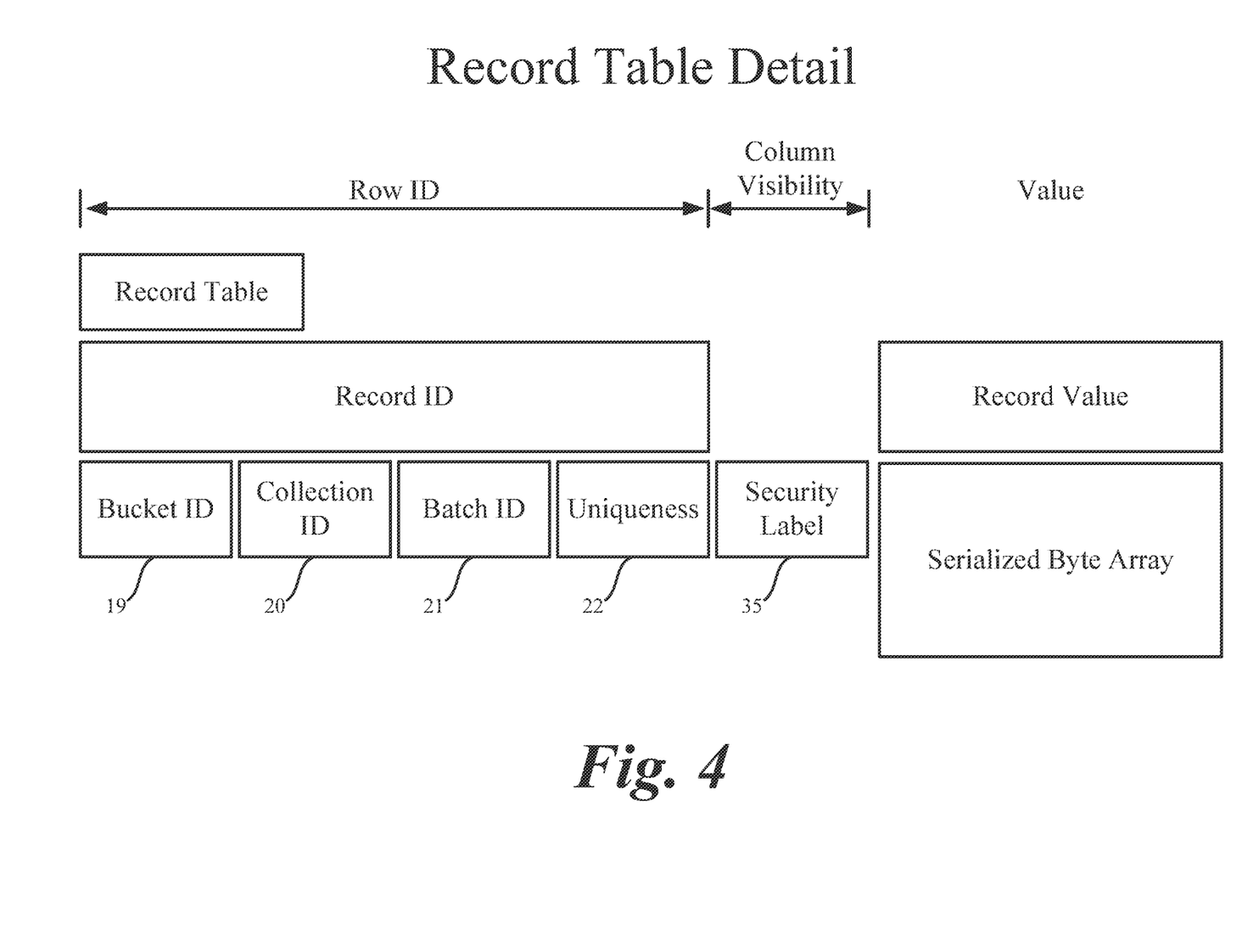
FIG. 4 is a schematic diagram of the record table of FIG. 3.

The record table I 1, as illustrated in FIG. 4, has four elements in its key. These elements enable efficient operation of various aspects of the system. These elements include Bucket ID 19, collection ID 20, batch ID 21 and uniqueness 22.

The process for storing records in the record table is designed to support both interactive retrieval of a set of records identified as meeting the criteria of a specific search, as well as efficient bulk processing of data in batches across time, to support analytics. This organization involves distributing records into 'buckets' that allow a natural distribution of buckets of records across multiple servers, thereby providing parallelism when processing data. To create the record table 11 each new record is assigned a bucket ID 19 using a round-robin process (i.e. assigning records to buckets in order, from 1 to N where N is the number of buckets, and starting over at 1, and so on) and also a batch ID 21 that is comprised of a timestamp divided by a given batch duration (for example, some number of seconds). The full record format is shown as in FIG. 4, but the operative elements are the bucket ID, which causes records to be stored uniformly throughout the record table 11, and the bucket ID which causes records to be stored in a continuous block of records within each bucket, because the underlying sorted key-value store organizes records into blocks via the sorting mechanism. The collection ID 20 is assigned when the collection is created and a collection name is provided by the user.

When follow-on processes are directed to read over records, they are provided the list of bucket IDs and a set of batch IDs to processes. A distributed job coordinator creates N independent processes (workers), each of which is assigned a one of the bucket IDs 19 and a batch ID 21 from the lists. Each of these workers then accesses a continuous block of records from the underlying key-value store using sequential disk access, which provides high throughput record reads. This high throughput is the result of each block of records being located on separate machines, in contiguous blocks, so that data on the individual servers is accessed simultaneously using sequential read patterns, which are much more efficient than random access patterns for conventional hard disk drives.

Figure 5:
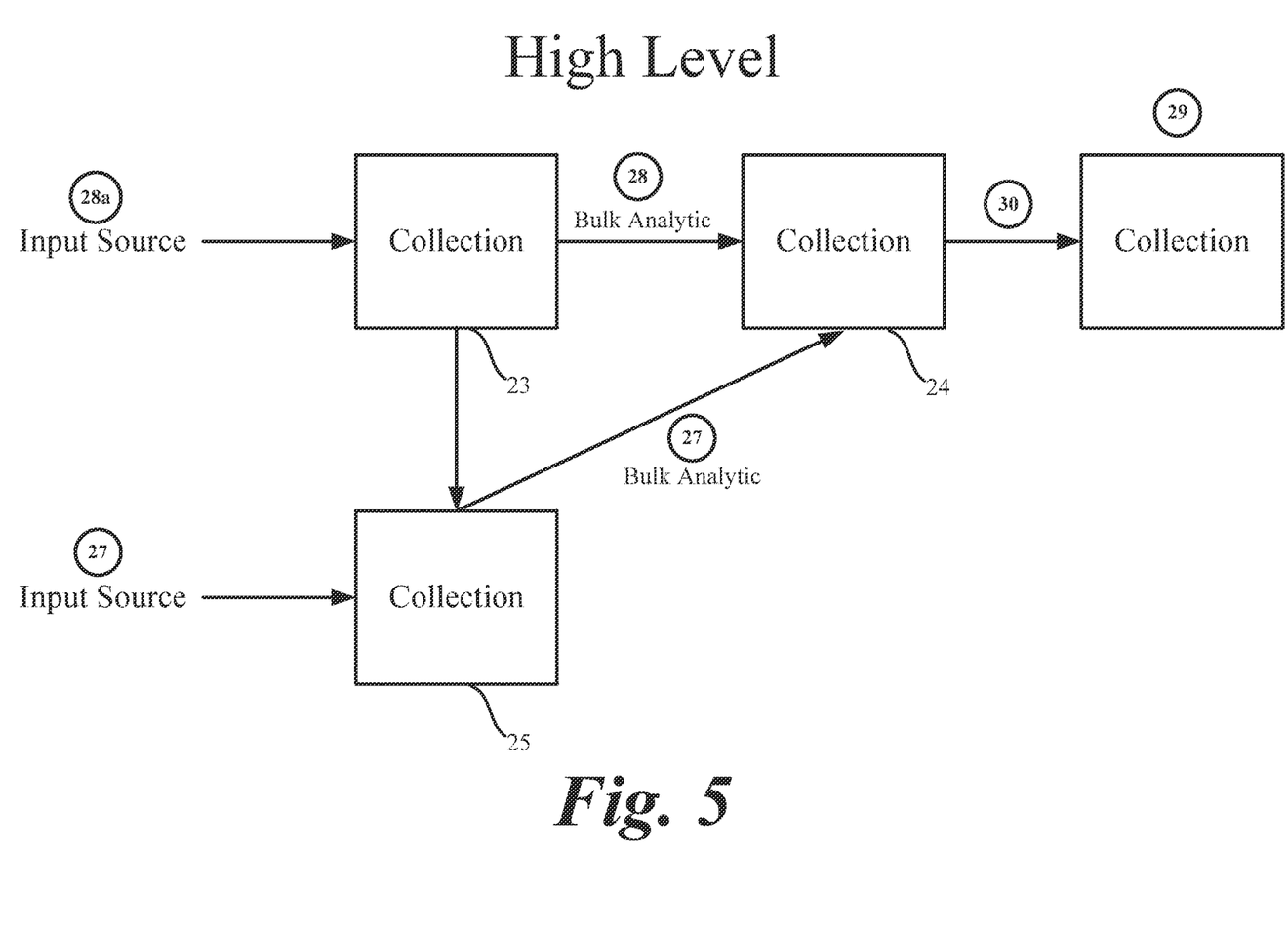
FIG. 5 is a flowchart of a notional example of an analytic workflow.

Often in order to answer an analytical question, one or more collections must be processed via bulk analytics transforms) that combine, summarize, filter, or aggregate information in original collections. FIG. 5 shows a notional workflow containing two input sources 26, 27, two collections containing raw data 23, 25, three bulk analytics 27, 28, 30, two of which are running on raw data 27, 28 and one of which is running on the output of another analytic (30). And two collections containing analytic results 24, 29.

Transforms enable bulk analytical workflows and relies on a system that automatically distributes data across multiple servers and allows for code to be executed on those servers. The code processes the data local to each server. Some key-value stores 2 can be used as the underlying system that feeds data to a MapReduce job, if they allow the local execution of code applied to some partition of the data each server manages. This system builds on that capability to enable analytical workflows, which is the chaining of multiple MapReduce jobs into a logical analytic workflow, called a transform in which each individual MapReduce job executes on the servers participating in a distributed key-value store and where the output of intermediate MapReduce job is written to either the key-value store or to a distributed file system, and where the output of the final MapReduce job is written to the key-value store. The output of each transform is written to a collection. Multiple transforms can be chained together to create more complex workflows. This has the advantage of allowing the input records and output records of each analytical workflow to be queried in-situ rather than needing to be made searchable by copying data into a separate query system. An example of a complex analytic work flow is shown in FIG. 5, where elements 27, 28, 29 are transforms and elements 23, 25, 24, and 29 are collections that can be queried in-situ.

In accordance with further embodiments of the present invention, a transform 61, consisting of one or more Map Reduce (also referred to herein as "transform") jobs 60 may be defined by a developer in, for example, a Java class, containing a list of MapReduce 'stages' as shown in FIG. 11. Each stage is preferably of a particular type, either a Map Stage 57, Combine Stage 58, or Reduce Stage 59. Stages may be further differentiated by whether they are the initial stage in a chain, an intermediate stage, or the final stage. Each stage contains the definition of one method, either a map ( ) method, a combine ( ) method, or a reduce ( ) method, which operate on Record representations containing an association of fields to values, or simple key-value pairs.

The system executes a transform by bundling stages into individual MapReduce jobs 60 (FIG. 11) which can consist of either a single map stage, map and combine stages, map and reduce stages, or all three map, combine, and reduce stages—when there is no map stage an identity map stage is used to simply pass unmodified records onto either the initial combine stage or reduce stage. A transforms stages may end up being bundled into multiple MapReduce jobs 60, but each stage belongs to only one MapReduce job. The system takes care of configuring each job to retrieve its input from either the key-value store, or from a distributed filesystem storing the results of a previous job, and also configuring the output to go to either the distributed filesystem for processing by a later job or to the key-value store for storing final results.

System 100 features an organization of records in the key-value store 2 that groups records into batches to support the efficient update of these workflows making a series of MapReduce analytics reusable, configurable, and secure.

Figure 6:
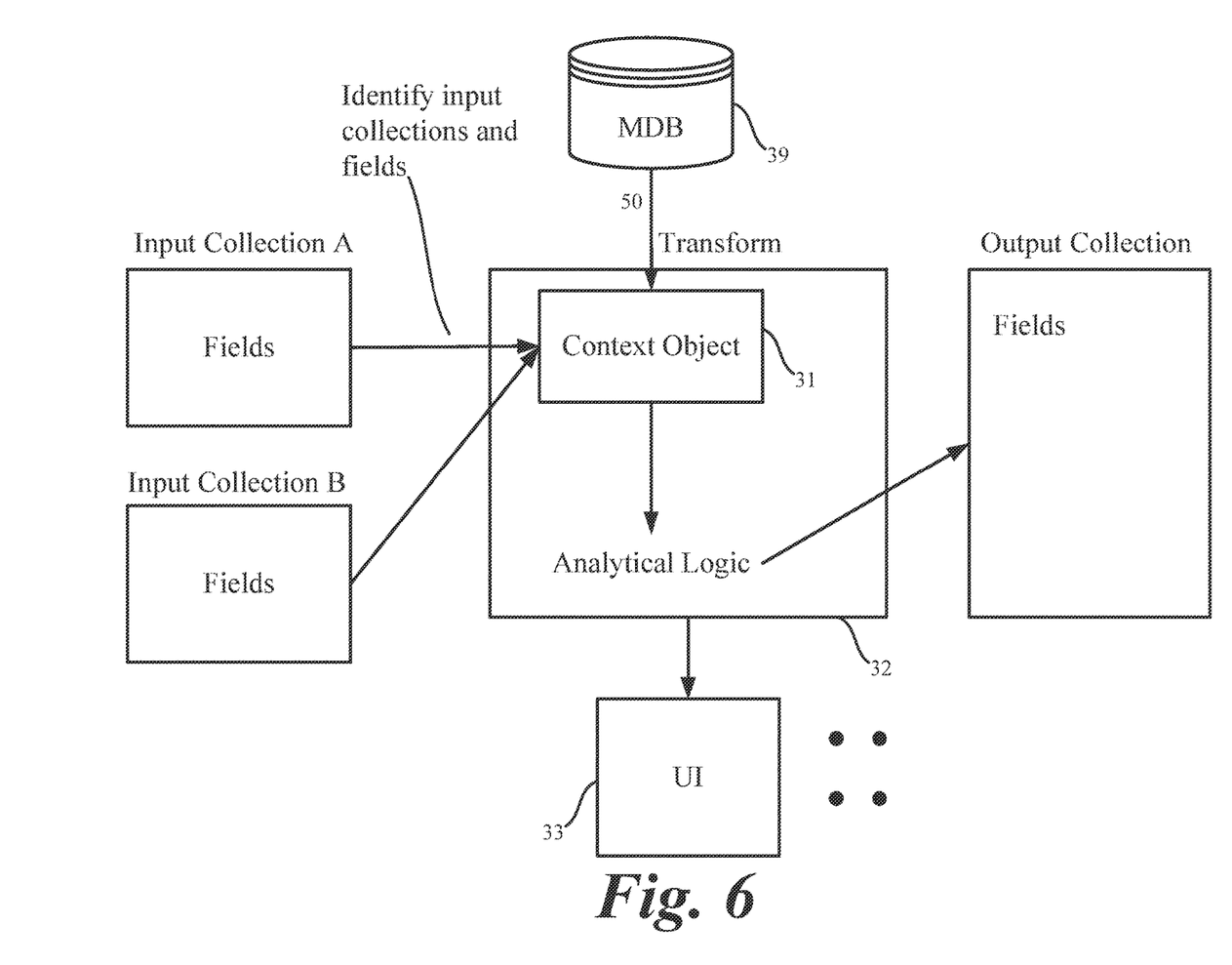
FIG. 6 is a schematic diagram of a pluggable transform framework.

The skill level required to create distributed analytical bulk processes is high, and therefore scarce. The parameterization of such processes enables them to be written once and reused many times by users otherwise unable to write these analytics on their own. The parameterization of these analytics, or transforms, involves providing developers with an API that includes a method for declaring which parts of the transform are configurable by an end user at run time. As illustrated in FIG. 6 and discussed below, this method of parameterization involves the MapReduce application being extended by adding an additional context object (31) that contains a set of parameters 50 that represent the configurable parts of a MapReduce job (transform) 32. Each parameter specifies what type it is, whether a line or more of text, a number, the name of a field, etc., whether it is a required field, a default value, and a description. Parameters are then read by the system when a package of MapReduce code (usually a JAR file) is uploaded to the system. FIG. 6 illustrates how analytic code can be quickly applied to any schema of data at run time.

Parameters for a particular MapReduce job 32 are presented to users via a user interface (UI) 33 prior to launching. Users can configure which data record collections the job 32 should use as input, to which data record collection output records should be written, and any parameters specified by the job. Any required parameters not filled out, or filled out parameters with values that are invalid will cause an attempt to launch the job to fail and prompt users to fill out the required parameters. This allows MapReduce code to apply to a variety of data record collections differing in record structure and for the application of the same MapReduce code in different ways from job to job via differing parameter values.

Code internal to the MapReduce job 32 then retrieves the user-configured values of these parameters from the management database 34 and uses them to modify the way processing of records is accomplished. Analytical transforms that execute as MapReduce jobs take advantage of this record structure by retrieving the necessary fields and processing their values. The set of fields that are processed can vary from execution to execution and are defined as parameters by the developer of the transform. These parameters are filled in by data workers who create specific configurations of these transforms to run over one or more sets of data records. This way data workers who have not written the transform can use the transform over and over in different contexts.

Further, the data records that are read by transform 32 may be filtered based on the combination of the security labels (attached to individual records) and the security tokens presented by the data worker scheduling the transform for execution. As transforms read over data records and produce new data records the transform may add additional security labels as necessary, but after new records are passed to the system to be stored, the system applies a new clause to the security label (which may simply be empty) that includes a unique token identifying the set of output records. This unique token may be presented by any queries or transforms wishing to read the records. Initially no user except the data worker who created the collection may possess this token.

Maintaining representative samples of large datasets efficiently for large data collections. Many analytical and statistical algorithms are designed to run on a sample of a data set. In a distributed system it can be difficult to maintain a representative sample without knowing how many data items have been ingested and how many data items exist total.

FIG. 10 illustrates a data ingest and sampling architecture according to a preferred embodiment of the invention, and further shows external data passing through processing nodes and being written to specific tables in the key value store 2. To maintain a representative sample 36 of a dataset by having each ingest node (35) generate a hash of each record and keep in memory a set of some number N of records whose hashes comprise the minimum N hash values for the duration of the ingest batch. As hashes of records are designed to be uniformly distributed throughout the hash space, the minimum N records constitute a representative sample of the records a single ingest node has processed.

At the end of the ingest batch, each ingest node writes its N sample records to a the sample table 36 in a key-value store 2 that stores key-value pairs in sorted order by keys. In this table the key is the hash of the record and the value is the serialized record. The first N combined samples in this table now constitute a representative sample of the entire dataset processed thus far. In future ingest batches this table is updated with new hash values and the representative nature of the first N records in this table is preserved. Any records that sort after the first N records can be discarded, usually by some separate garbage collection process. The particular hash function used is not terribly important, and an MD5 or an SHA based hash function will suffice, for example.

The actual data written to the sorted key-value store 2 consists of a collection name followed by the hash value as they key and the original record is stored in the value.

When retrieving a sample of records for a particular collection, a scan is begun at the first key that begins with the name of the collection that proceeds until the number of sample records desired is retrieved or until the sample records in the table are exhausted.

A discussion of schema-free ingest and indexing follows. To reduce the effort and complexity in importing data, particularly new and changing data, a schema-free ingest is required. Fundamentally the key to building a schema free ingest is to ensure that the entire ingest process is built such that it does not rely on the logical structure of the data to execute ingest. This means that the set of fields, and types and lengths of values do not have to be known or used by the system as part of ingest. Both values and fields are passed directly into the system. Collection based meta-information is gathered as data is ingested and is stored in the relational database 3 to assist in developing indexing rules (which can be overridden by the user). Also valine-based meta information (cardinality, presence etc.) is collected on ingest and stored separately in the stats table 13 in the key value store 2 to quick retrieval.

This is implemented via some number of physical data format parsers designed to read fields and values. Each parser is designed to discover the set of Melds and values within source data by parsing only the physical format of the data. Examples of physical formats include XML, CSV, JSON, relational database tables, etc. Any field names discovered are noted and stored with the values when imported into the system. The type of each value is discovered as part of the parsing process and the value and its type information are also stored in the system under the fields in which they were discovered. Optionally, some type detection algorithms can be applied to values to further distinguish types from common representations, such as string representations of dates or numbers. When a more specific type is found for a value, the value is stored associated with the more specific type. Fields may contain 'simple' values such as strings, numbers, etc., and also may be 'complex' values consisting of lists of values or more maps of fields to values. The system can handle an arbitrary nesting of fields and values.

Each unique value type is also indexed in such a way as to enable range scans over values when they are stored in a sorted key-value store that sorted values in lexicographical order, byte by byte. This requires that some types of values be transformed when stored in the index table, consisting of key-value pairs sorted by key. Each type has its own encoders to transform original values to appropriate representations in this index table 12. New types can be added to the index by creating new type encoders.

A discussion of optimizations around multi-dimensional range scans (composite indexes) follows. When indexing multi-dimensional data, such as latitude and longitude, techniques to map these multiple dimensions to one dimension can enable the efficient retrieval of data points falling in a multi-dimensional box. Use of Z-order curves to interleave values of a given record supports fast query on range scans across multiple values. In addition, this capability is provided via a simple user interface 1 and API calls, not requiring the user to do any development to create and maintain the indexes. These indexes can be built on 2 up to any arbitrary number of values in a collection, although it's optimized for a low number of fields (2-5). The Z-ordered curve is built from the interleaved bytes of each indexed value.

A discussion of indexing multiple types of data from multiple collections for efficient cross collection and cross-field queries follows. As illustrated in FIG. 11, an index structure may be created that interleaves the entries for values from multiple collections and multiple fields. For every value in a Record that gets indexed, at least two entries are written to the index table 37. In general index entries consist of a search term 38 (with any collection or field specific information required 39, 40 which comprises the beginning portion of a key in a key-value pair, and a record ID 41 associated with that key (FIG. 2).

An entry that is not prefixed by the field name 42. For example, if the field name were 'First name' and the value 'Bob' we write an index entry as follows: $any_Bob. Note that the value 'Bob' appearing in any field will result in the same index entry.

An entry that is prefixed by the field name 43. For example, if the field name is 'First name' and the value is 'Bob' we write an index entry as follows: First name_Bob When querying without a field name 42, a key is constructed that pretends the '$any' field to the beginning of the search term. This allows a user querying for 'Bob' in any field to find the index entry, $any_bob, in the index.

When writing index entries, the collection id 39 is prepended. So when writing an index entry for the field 'First name' and value 'Bob' appearing in the collection 'Customers', we write the index entry: Customers_First name_Bob and also an entry, Customers_$any_Bob.

Using a single index table for multiple collections. We store all index entries created from any data record collection in the same index table 12 in a sorted key-value store. When querying multiple collections at once, we create keys for each collection specified by the user and query for terms in each collection. Queries consist of a scan over the set of key-value pairs beginning with a collection ID, field information, and search term to retrieve a set of record IDs. The full records identified with each record ID are then typically retrieved by doing additional lookups on a separate table containing all the full records as values, and record IDs as keys.

Figure 7:
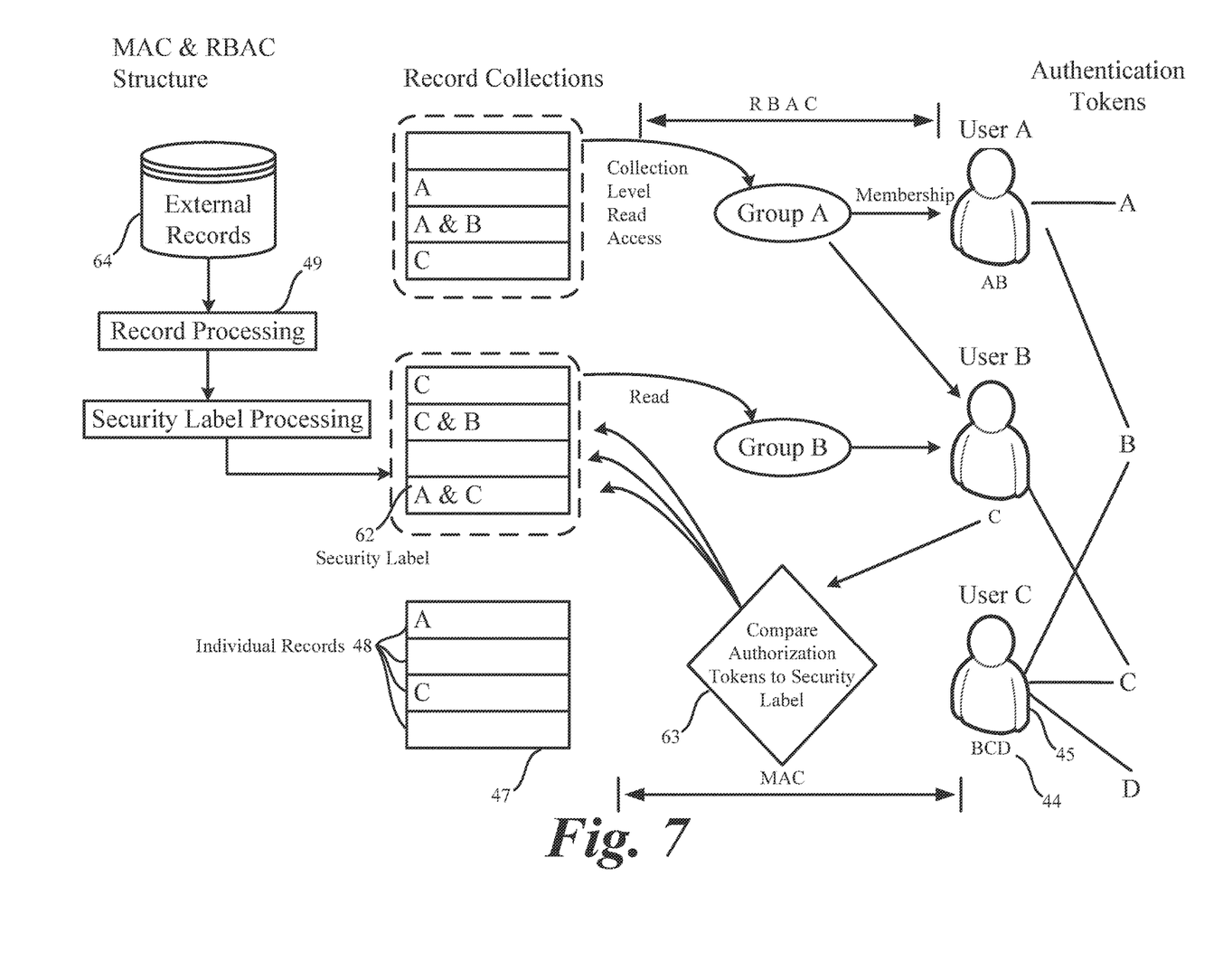
FIG. 7 is a system flowchart illustrating the security architecture that enforces both mandatory and role base access control.
Figure 8:
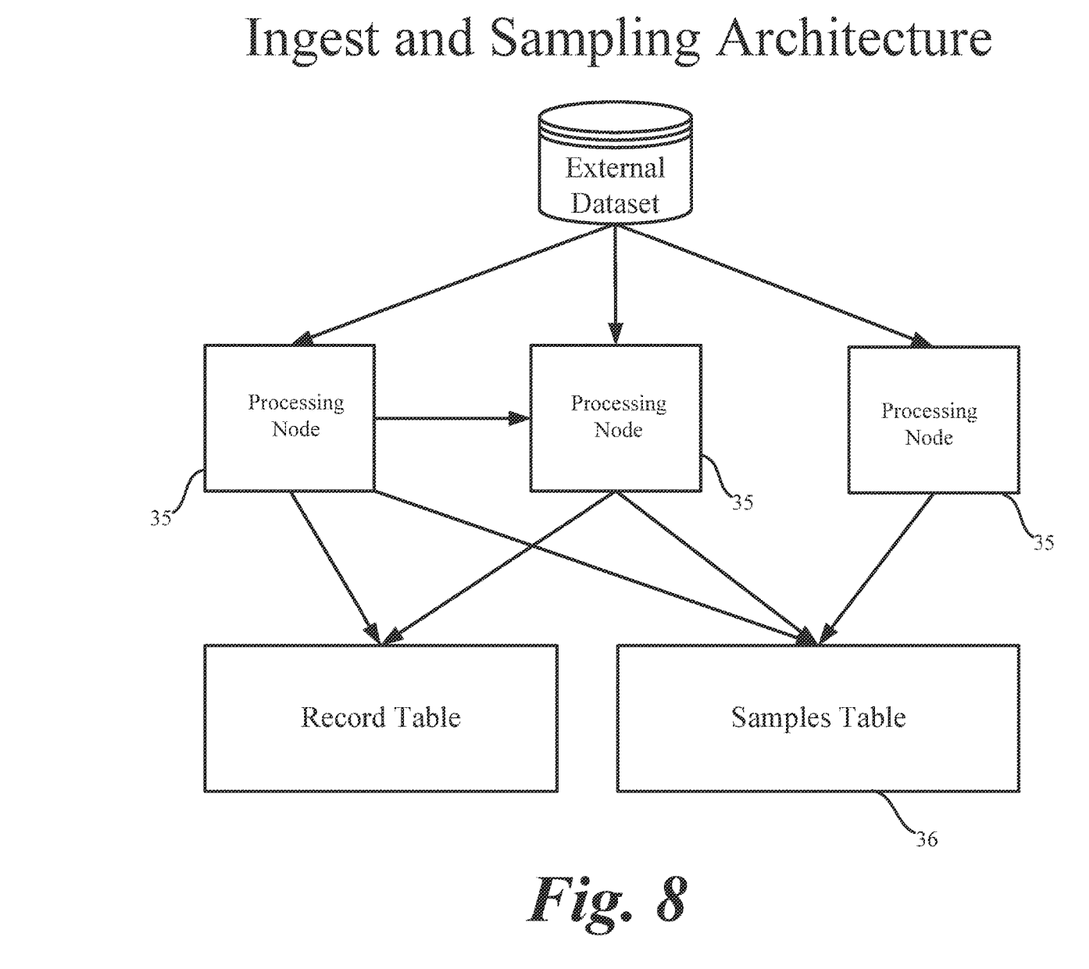
FIG. 8 is a system flowchart illustrating a data ingest and sampling architecture.
Figure 9:
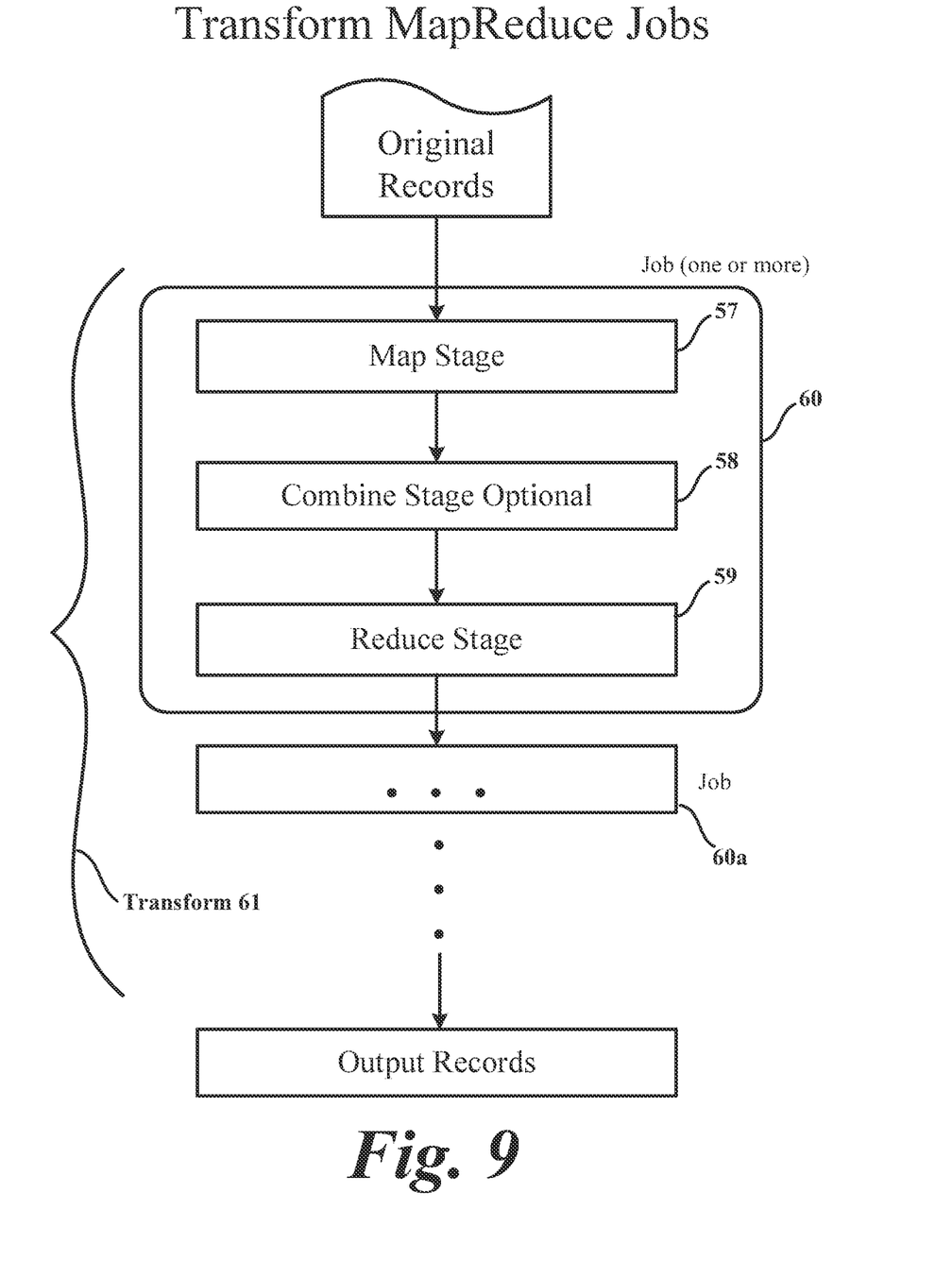
FIG. 9 is a flow chart illustrating various transform steps.

A discussion of index structures that don't include the field name to enable query across fields follows. Both Role Based Access Control (RBAC) and Mandatory Access Control (MAC) offer users powerful ways of protecting data from unauthorized access. Many systems offer only one method or the other. FIG. 7 illustrates the implementation of record level Mandatory Access Control (MAC) with collection level Role Based Access Control (RBAC) security models, a system for controlling access between users, groups, and data record collections using access token expressions. A preferred embodiment includes the ability to determine the access tokens 44 of the user (45) importing records and construct Boolean expressions of these tokens for each field of each record that the user stores. The access tokens that a user possesses is determined by the user's security specification and the security specification of any groups the user is a member of Note the possession of tokens by a user can be manipulated at any time to grant or revoke access.

A data record collection 47 consists of some set of data records 48 stored in the system. Each record within a data record collection is labeled 49 upon import into the system with a unique generated token, specific to one particular data record collection to which it belongs.

A security label expression 62 consists of one or more tokens separated by Boolean operators & and | which describe which tokens the system should require. Two tokens or sub-expressions separated by & are both required. Only one of two tokens or sub-expressions are required when they are separated by |. In addition parentheses ( ) can be used to group sub-expressions.

Some records may have security expressions which can be parsed by the system and added to the final security label expression that is stored with the record. In this case, a user 45 must possess both the token 44 specific to the data record collection and any additional tokens required by the additional security expression 62 of a particular record in order to read the record. The key value store carries out this comparison 63.

Initially only the importer of external data 64 into a data record collection 47 possesses the token 44 required to read records from this data record collection. The token to read this data record collection can be assigned to additional groups consisting of zero or more users in order to grant those users the ability to read records from this data record collection.

Each time a user queries the system 100, the set of tokens assigned to any group to which a user belongs is retrieved and passed to the underlying key-value store which uses these tokens to attempt to satisfy the security label expression stored on each record, and the system filters out any record whose security label expression is not satisfied by the set of tokens the user possesses.

A client that allows users to query this system must handle authenticating users, and retrieving an authenticated user's authorization tokens from an external system and pass those tokens faithfully onto the read API of the key-value store 2, which in turn uses those tokens to filter records.

In accordance with a preferred embodiment of the invention, the system is implemented by using security label parsers 49 to parse any security information found on external records when they are imported into the system and translating them to security label expressions 62 that the key-value store understands indicating that a user must possess whatever tokens are required to satisfy the record-specific security label expression in order to read the data.

To establish the veracity of analytical results, examining the provenance of data as it is processed from the original source through analytical transforms is important. Whenever a MapReduce transform 28, 27, 30 is run using one or more collections 23, 25, 28 as input, the system maintains a list of batches within each input collection that has already been processed, and the IDs 20 of batches are generated and written as output to a new collection.

Preferably, every transform launched will cause some records to be written to a relational database 3 containing the names or IDs of data record collections read as input, the name of the bundle of MapReduce code used, and the configuration options of the particular job. This record is that is required to reconstruct a history of how a data record collection has been used to create derivative collections, and also to reconstruct the history of what processes were involved in creating a particular data record collection, via simply SQL queries against the relational database. In addition, batch-level information stored in these records can help identify which batches from input collections contributed to which batch of an output collection.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. A method for efficiently ingesting, indexing, storing, data modularly for parallel transforming the data across multiple machines, the method comprising:

storing serialized raw data comprising a set of multiple records in a record table, each record of the set of multiple records having a schema different from every other record of the set of multiple records;

processing the serialized raw data to populate a stats table;

processing the serialized raw data to populate an index table, wherein processing the serialized raw data to populate the index table comprises assigning bucket IDs and batch IDs to the at least one record of the serialized raw data, wherein each bucket ID is assigned using round-robin to store the at least one record of the serialized raw data uniformly in the record table, and wherein each batch ID comprises a timestamp divided by a batch duration to store the at least one record of the serialized raw data in a continuous block within the bucket;

processing the serialized raw data to populate a composite index; and transforming independently each of the at least one record of the serialized raw data via one or more first user-selected processes to generate at least one first result, and storing the at least one first result in a first memory at a first location.

2. The method of claim 1, further comprising:

accessing the at least one first result from the first location;

transforming independently each of the at least one first result via one or more second user-selected processes to generate at least one second result, and storing the at least one second result in a second location, wherein the at least one first result and the at least one second result are concurrently accessible.

3. The method of claim 1, wherein the one or more first user-selected processes comprises at least one of a map process, a combine process, or a reduce process.

4. The method of claim 1, wherein the first location comprises a key-value store or a distributed filesystem.

5. The method of claim 1, further comprising:

assigning a context object to each of the one or more first user-selected processes, wherein the context object comprises a set of parameters that represent the configurable parts of the user-selected process.

6. The method of claim 5, wherein each of the parameters comprises a type, length of text, a number, a name of a field, a required field, a default value, and a description.

* * * * *